(12) United States Patent
Karatajew et al.

(10) Patent No.: US 12,345,231 B2
(45) Date of Patent: Jul. 1, 2025

(54) METHOD OF IMAGING A WIND TURBINE ROTOR BLADE

(71) Applicant: Siemens Gamesa Renewable Energy A/S, Brande (DK)

(72) Inventors: Maxim Karatajew, Celle (DE); Lars Holm Nielsen, Noerre Snede (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 102 days.

(21) Appl. No.: 18/284,649

(22) PCT Filed: Mar. 21, 2022

(86) PCT No.: PCT/EP2022/057276
§ 371 (c)(1),
(2) Date: Sep. 28, 2023

(87) PCT Pub. No.: WO2022/207380
PCT Pub. Date: Oct. 6, 2022

(65) Prior Publication Data
US 2024/0175426 A1 May 30, 2024

(30) Foreign Application Priority Data
Apr. 1, 2021 (EP) ..................................... 21166618

(51) Int. Cl.
*F03D 17/00* (2016.01)
*H04N 23/61* (2023.01)
*H04N 23/695* (2023.01)

(52) U.S. Cl.
CPC ......... *F03D 17/003* (2023.08); *F03D 17/028* (2023.08); *H04N 23/61* (2023.01); *H04N 23/695* (2023.01); *F05B 2270/8041* (2013.01)

(58) Field of Classification Search
CPC .... F03D 17/003; F03D 17/028; F03D 17/013; F03D 17/0285; H04N 23/61;
(Continued)

(56) References Cited

U.S. PATENT DOCUMENTS 10,776,660 B2 * 9/2020 Newman ............... G06T 7/0004
11,421,660 B2 * 8/2022 Li ........................... H04N 7/18
(Continued)

FOREIGN PATENT DOCUMENTS

EP 3 770 424 A1 1/2021

OTHER PUBLICATIONS

PCT International Search Report and Written Opinion for PCT/EP2022/057276 mailed on Jun. 16, 2022.

*Primary Examiner* — John R Schnurr
(74) *Attorney, Agent, or Firm* — Schmeiser, Olsen & Watts, LLP

(57) ABSTRACT

A wind turbine rotor blade imaging arrangement is provided, including a multi-axis gimbal mounted to the exterior of the wind turbine and configured to adjust its orientation in response to one or more received settings; a camera mounted on the multi-axis gimbal and arranged to capture images of a rotor blade; an image analysis unit configured to analyze the captured images; and a camera orientation controller configured to compute updated gimbal settings on the basis of the image analysis output.

15 Claims, 5 Drawing Sheets

(58) Field of Classification Search
CPC ........... H04N 23/695; F05B 2270/8041; F05B 2260/80; Y02E 10/72; F16M 11/123; G03B 17/561; G06T 7/174
See application file for complete search history.

(56) References Cited

U.S. PATENT DOCUMENTS

| | | | |
|---|---|---|---|
| 2009/0266160 A1* | 10/2009 | Jeffrey | F03D 17/00 73/455 |
| 2011/0206511 A1* | 8/2011 | Frydendal | F03D 7/0224 416/61 |
| 2012/0076345 A1* | 3/2012 | Fritz | F03D 80/50 382/100 |
| 2013/0300855 A1* | 11/2013 | Fritz | H04N 7/18 348/82 |
| 2013/0307961 A1* | 11/2013 | Puigcorbe Punzano | F03D 17/00 348/82 |
| 2014/0267693 A1* | 9/2014 | Newman | H04N 23/23 348/128 |
| 2015/0043769 A1* | 2/2015 | Newman | G06T 7/001 382/100 |
| 2017/0122736 A1* | 5/2017 | Dold | G01C 15/006 |
| 2018/0003159 A1* | 1/2018 | Bunge | G06T 7/0004 |
| 2018/0003161 A1* | 1/2018 | Michini | G06T 7/0004 |
| 2018/0149138 A1* | 5/2018 | Thiercelin | F03D 80/50 |
| 2018/0259955 A1* | 9/2018 | Noto | G08G 5/55 |
| 2019/0098221 A1* | 3/2019 | Troy | H04N 7/18 |
| 2019/0370999 A1 | 12/2019 | Liu et al. | |
| 2020/0226480 A1* | 7/2020 | Johnston | H04N 7/188 |
| 2020/0260013 A1* | 8/2020 | Kaufmann | F03D 17/00 |
| 2022/0195994 A1* | 6/2022 | Elberling | G06T 7/001 |
| 2022/0247139 A1* | 8/2022 | Devaraj | H01R 39/26 |
| 2022/0268261 A1* | 8/2022 | Gollnick | G06T 7/0004 |
| 2022/0275787 A1* | 9/2022 | Gollnick | G06T 7/73 |
| 2023/0105991 A1* | 4/2023 | Karatajew | F03D 17/00 416/61 |
| 2023/0106537 A1* | 4/2023 | Mingaliev | F03D 17/00 702/33 |

\* cited by examiner

METHOD OF IMAGING A WIND TURBINE ROTOR BLADE

CROSS-REFERENCE TO RELATED APPLICATIONS

This application claims priority to PCT Application No. PCT/EP2022/057276, having a filing date of Mar. 21, 2022, which claims priority to EP Application No. 21166618.5, having a filing date of Apr. 1, 2021, the entire contents both of which are hereby incorporated by reference.

FIELD OF TECHNOLOGY

The following relates to a method of imaging a wind turbine rotor blade, and a wind turbine rotor blade imaging arrangement.

BACKGROUND

Wind turbine rotor blades are exposed to harsh environmental conditions and may suffer impact damage from hailstones, sand, or other airborne particles. It is important to repair minor damage to a rotor blade exterior in order to avoid more severe damage. For example, water trapped in a small fissure or crack can expand on freezing, exacerbating the damage. Furthermore, even minor damage in the outer skin of the rotor blade can act as an unintended target for lightning strikes, which can result in very severe or even catastrophic damage. For these reasons, it is important to regularly inspect the outer surface of a rotor blade in order to identify surface anomalies.

However, the dimensions of a present-day rotor blade (which can easily have a length in excess of 70 m) rule out the possibility of identifying defects in a single image of an entire rotor blade captured using a conventional camera. This is because the camera would have to be far away in order to include the entire rotor blade in its field of view, and the ensuing resolution would be too poor to allow identification of damage in the order of a few millimeters.

In one approach, a person wearing a rope harness can be lowered from the hub and can visually inspect the rotor blade for damage. However, the risk of injury is significant. Furthermore, this approach is time-consuming and results in significant downtime, so that this type of on-site inspection can be very expensive.

Therefore, various automated camera-based inspection techniques have been proposed for the detection of damage to a rotor blade exterior.

For example, a camera may be mounted on a horizontal track and made to slide back and forth while capturing images of a rotor blade, which can also be pitched during the imaging sequence so that all aspects of the rotor blade surface can be imaged.

US 2019/0370999 A1 provides a method, a system and an equipment for automatically detecting and tracking a blade, used for tracking the blade of the wind power generator through an unmanned aerial vehicle. The unmanned aerial vehicle is provided with a cradle head, the cradle head controls a shooting angle of a camera, including the following steps: acquiring a blade video file through a camera, detecting at least one frame of the blade image in the blade video file, and extracting side edges of the blade region in the at least one frame of blade images; tracking and detecting the side edges of the blade region in temporally adjacent multi-frame blade images in the blade video file according to the side edges of the blade region; determining a center point of the blade region in each frame of the blade image; and adjusting the cradle head.

EP 3770424 A1 describes an automated turbine blade monitoring system that delivers on-demand photographs to avoid extensive labor costs from onsite inspections, which increases the frequency of blade inspections and ultimately extending the life of wind turbine blades. Blade condition data can be collected remotely without sending technicians to the turbine, improving mean time between visits to the unit.

In the conventional techniques, some degree of error is unavoidable, and the accumulated error can lead to very large discrepancies between the actual position of a defect and its local coordinates. For example, when using images obtained from a drone-based system, the errors can be even more significant due to the inherent instability of the aerial vehicle and because of limitations in accuracy of satellite-based altitude readings.

The image data obtained by a drone can be noisy. It may not be possible to compensate for noise by using feature-matching techniques between consecutive images, since a rotor blade surface is generally uniform and devoid of significant features. Also, the images may be captured in poor lighting conditions or varying lighting conditions. As a result, the known techniques may be unable to image a complete rotor blade to the desired level of accuracy. This can result in significant costs due to delays when an on-site maintenance crew cannot find a defect at the reported location and must search for it.

SUMMARY

An aspect relates to an improved way of imaging a wind turbine rotor blade.

According to embodiments of the invention, the wind turbine rotor blade imaging arrangement comprises a multi-axis gimbal mounted to the exterior of the wind turbine and configured to adjust its orientation in response to one or more received gimbal settings; a camera mounted on the multi-axis gimbal and arranged to capture images of a rotor blade; an image analysis unit configured to analyze the captured images; and a camera orientation controller configured to compute updated gimbal settings on the basis of the image analysis output. The image analysis unit generates output data that can be used by the camera orientation controller as a basis from which to compute updated gimbal settings.

The imaging arrangement can be used to perform an image collection sequence in which the camera is controlled to collect or capture multiple images of the currently presented rotor blade surface, i.e., the rotor blade surface that can be "seen" by the camera. For example, an image collection sequence may result in 50 images of the pressure side when the rotor blade is oriented so that its pressure side faces the camera.

By applying this teaching, it becomes possible to automatically take accurate images of a long pre-bent rotor blade using a fixed camera, e.g., since the curvature of the outermost portion of the rotor blade may take it outside the initial field of view of the camera.

In embodiments of the inventive imaging arrangement, the orientation of the optical axis of the camera relative to two or more axes in three-dimensional space is determined directly by the gimbal settings, i.e., by the pitch, roll and yaw settings of a three-axis gimbal; or by the pitch and roll gimbal settings of a two-axis gimbal. The camera may be assumed to be rigidly mounted on a support arm of the gimbal, so that a rotation of any axis of the gimbal has the effect of rotating the camera by the same amount. The terms "camera orientation controller" and "gimbal controller" may therefore be regarded as synonyms.

An advantage of embodiments of the inventive imaging arrangement is that it can be realized at relatively low cost. It can be realized without any dedicated hardware components and can be assembled from off-the-shelf components. The image analysis unit and the camera orientation controller can be completely or partially realized as software modules running on a processor of a higher-level controller. A realization largely in the form of software modules can have the advantage that applications already installed on an existing system can be updated, with relatively little effort, to install and run the steps of embodiments of the inventive method. A further advantage of embodiments of the inventive imaging arrangement is that it does not require a device such as a drone, or an operator with drone experience.

According to embodiments of the invention, the method of imaging a wind turbine rotor blade comprises the steps of mounting a multi-axis gimbal of such an imaging arrangement at the exterior of the wind turbine; and operating the camera of the imaging arrangement to capture images of the rotor blade, whereby a step of capturing an image is preceded by a step of adjusting the multi-axis gimbal at least on the basis of the image analysis output.

The multi-axis gimbal can be mounted at any suitable fixed body at the exterior of the wind turbine. For example, the gimbal may be attached to a holder secured to the tower, at a suitable height above ground. In a particularly simple approach, the gimbal may be mounted in a lower region of the tower. When a rotor blade is brought to a suitable angular position, e.g., the "4 o'clock" or "8 o'clock" position, the camera is then favorably placed to capture images of the rotor blade along its entire length. Alternatively, for a land-based wind turbine, the gimbal can be mounted on a suitably rigid support such as a tripod, at a point near the wind turbine tower, for example on the foundation.

In the context of embodiments of the invention, it shall be understood that an image captured by the camera may show only a region of the rotor blade (the imaged surface region fills the image) or may also show background (e.g., parts of the sky, the ground, the sea, the wind turbine tower, the hub). A long rotor blade is difficult to image using a conventional camera setup, since the very thin tip tapers to a flat and narrow region that can be difficult to identify against the background. These problems are exacerbated in the case of pre-bent rotor blades, which have a pronounced curvature in the upwind direction. The purpose of the upwind curvature is to prevent the rotor blade tip from colliding with the tower during operation of the wind turbine, in which the rotor blade is made to "straighten out" by the wind load. However, the curvature of the rotor blade when held stationary for an imaging procedure can add to the difficulties in obtaining a complete image set.

Embodiments of the inventive method overcome this problem by making use of a multi-axis gimbal to support the camera, and by adjusting the gimbal axes to ensure that the camera is optimally in position to capture the next image. The gimbal axes are adjusted at least on the basis of image analysis of one or more previously captured images. For example, image analysis may indicate that, for the next image, the camera's optical axis should be adjusted further outward (in the direction of the tip) as well as further towards one side. Each captured image can be processed by the image analysis unit, and the image analysis output can be used by the camera orientation controller to update the gimbal settings in preparation for capturing a subsequent image.

In embodiments of the invention, the image analysis unit informs the gimbal controller to "proceed" if an image was deemed satisfactory, e.g., with respect to resolution, brightness, contrast, color, location of details of the photo taken, etc., or to "re-take" if that image was not deemed satisfactory. In other words, the steps of capturing an image of a rotor blade region, analyzing the captured image, and adjusting the gimbal settings are repeated as necessary until a satisfactory image is obtained. In this way, the relevant steps can be repeated in an iterative loop until the image of that rotor blade region is deemed satisfactory.

As indicated above, the multi-axis gimbal can be a two-axis gimbal configured to rotate about two orthogonal axes, allowing adjustments in pitch and roll, pitch, and yaw, or roll and yaw.

However, in embodiments of the invention, the multi-axis gimbal is a three-axis gimbal that can rotate about three orthogonal axes, allowing adjustments in pitch, roll and yaw. The gimbal settings computed by the camera orientation controller can therefore comprise a pitch angle, a roll angle, and a yaw angle. Such angles may be referred to as Euler angles, Tait-Bryan angles, Cardan angles, etc.

Embodiments and features of the invention are given by the dependent claims, as revealed in the following description. Features of different claim categories may be combined as appropriate to give further embodiments not described herein.

A wind turbine generally comprises several rotor blades, usually three. In the following, without restricting embodiments of the invention in any way, it may be assumed that, during an image collection sequence, the camera of embodiments of the inventive imaging arrangement is controlled to collect or capture multiple images of a single rotor blade, for example 50 images of a rotor blade face (e.g., pressure side, suction side, leading edge).

In embodiments of the invention, the imaging arrangement also comprises a rangefinder configured to measure a distance between the camera and an imaged region of the rotor blade.

The rangefinder can comprise a lidar system, a laser rangefinder, or any suitable distance tracking means. The rangefinder can continually establish the distance from the camera to the imaged surface, and this distance can be reported at the instant at which an image is captured.

Along with the rangefinder data, which may quantify at least the distance to the previously imaged surface region, the camera orientation controller can compute the relevant axis settings to adjust the gimbal (and camera) orientation.

An advantage of embodiments of the inventive method is that a complete set of images can be more quickly obtained, and the images will exhibit a favorably low level of noise, since neighboring images may be obtained at a similar depth of field. The images therefore need less processing prior to an image stitching procedure, which in turn can lead to a more accurate result.

Embodiments of the inventive method may be carried out as follows: The aerodynamic rotor is stopped in a position giving the best view of the rotor blade that is to be inspected, e.g., with that rotor blade at the "4 o'clock" position. The gimbal is controlled to direct the camera towards one end of the rotor blade. The camera is then controlled to commence capturing images which are forwarded to the image analysis unit, and the rangefinder delivers its measurements to the camera orientation controller. The output of the image analysis and the rangefinder information is used by the camera orientation controller to compute settings for the gimbal axes that will ensure that—for a subsequent image—the optical axis of the camera is directed at a region squarely on the rotor blade (a region that slightly overlaps a previous correctly captured image). To this end, the image analysis module is configured to detect the rotor blade, i.e., to distinguish the rotor blade from the background (sky, clouds, etc.) in the image. For example, the image analysis unit may be configured to perform suitable image processing steps such as edge detection to distinguish the rotor blade from the image background.

The updated gimbal settings ensure that the camera is always oriented optimally to "see" the next part of the rotor blade that is to be imaged. The gimbal settings can ensure that the next image follows the previous image; and the camera settings ensure that an image covers as much as possible of the rotor blade (e.g., the image includes both "left-hand side" and "right-hand side" of the visible surface). By controlling the camera in this manner, it is possible to quickly obtain a complete set of good-quality images, thereby minimizing the necessary downtime of the wind turbine. The favorably high quality of the set of images simplifies the next stage, i.e., image-stitching, and facilitates accurate identification of damage on the rotor blade surface.

Any suitable convention may be used to describe the orientation of the camera's rotating XYZ frame of reference relative to a fixed xyz frame of reference. The orientation of the camera's axes XYZ may be described as indicated above using Euler angles, Tait-Bryan angles, Cardan angles, etc. Because the camera is firmly mounted on the gimbal, the viewing angle and distance tracking unit effectively measures and reports the orientation of the camera's optical axis.

The gimbal is mounted on a rigid body, e.g., onto an adapter held by a strap or track attached about the wind turbine tower, or on a robust tripod arranged on the ground near the base of the tower, etc.

Embodiments of the inventive imaging arrangement also comprise a camera controller that is configured to adjust parameters such as the focal length of the camera, the shutter speed etc. The camera may be assumed to have a variable focal length, e.g., by a parfocal lens ("zoom lens"). Any one of the camera parameters may also be adjusted or corrected based on the image analysis output. Prior to an image capture step, the camera orientation controller can provide updated gimbal settings, and the camera controller can provide updated camera settings. Once the gimbal has been adjusted, the camera controller then causes the camera to capture an image. These steps are repeated until a sufficient number of images have been collected for a desired region of the rotor blade, for one side of the rotor blade, or for the entire rotor blade surface, for example.

The camera orientation controller and camera controller can be realized as a combined control unit or may be subordinate to a higher-level control unit. Equally, control of any component of the imaging system may also be managed by a user over a suitable user interface, for example a user may determine that a camera parameter (e.g., image capture rate, image resolution, etc.) should be adjusted.

As mentioned above, a two-axis gimbal can be configured to rotate about two orthogonal axes, for example so that a camera mounted to the gimbal can be "pitched" (e.g., in the direction of the longitudinal axis of the rotor blade) and "rolled" (e.g., in a side-to-side direction across the rotor blade). This type of gimbal can be sufficient to image long, essentially straight rotor blades. However, as mentioned above, a long rotor blade may be "pre-bent", with significant curvature in the upwind direction. A long rotor blade may also be "twisted", i.e., the chord plane is not flat, but twists to some extent about the longitudinal axis of the rotor blade. Therefore, in embodiments of the invention, the multi-axis gimbal is a three-axis gimbal configured to rotate about three orthogonal axes, i.e., camera mounted to the gimbal can be pitched, rolled, and yawed. The ability to rotate the camera about three orthogonal axes means that a long, pre-bent and twisted rotor blade can be optimally imaged over its entire length.

Before commencing an imaging sequence, a fixed frame of reference is defined. This can be done by assigning a specific location for the gimbal, i.e., a location whose position within a reference frame is known and defining the gimbal settings relative to this location. Alternatively, it may be desirable to calibrate the imaging arrangement relative to a reference frame prior to an imaging sequence.

In an embodiment, a reference coordinate system (or "reference frame") is defined in terms of a fixed body such as the wind turbine tower. This reference frame may be a Cartesian coordinate system with X, Y and Z principle axes. These three axes can be assigned in any convenient way. The origin of such a reference coordinate system may for example be defined to lie in the center of the wind turbine hub, i.e., at the intersection of the longitudinal axes of the rotor blades. Equally, the reference coordinate system may be set up in terms of the rotor blade being imaged, and the origin may be located at the base of the rotor blade. In such a reference frame, the Z-axis may be assigned to coincide with the longitudinal axis of the rotor blade.

In embodiments of the invention, an initial calibration procedure comprises the steps of defining a fixed reference frame; directing the optical axis of the camera towards the origin of the reference frame and capturing an initial image; and recording a distance measurement for the initial image. The parameters established in this manner—i.e., the reference frame origin, initial viewing angles and initial distance—serve as the basis upon which all subsequent images are defined. The distance measurement for the initial image may be measured and recorded manually, for example, or may be established in an automated manner.

One or more of the gimbal axes may be re-oriented in each subsequent imaging step. For each image capture step, image data and position data are synchronized, i.e., the gimbal axis settings and rangefinder measurements at the instance of image capture are recorded. With embodiments of the inventive system, the orientation of the camera's coordinate system relative to the fixed reference frame can be established for each image. This knowledge allows each image to be transformed or projected into a common coordinate system (e.g., the fixed reference frame) by a process called homography mapping, which is a part of the stitching procedure. Once all images have been "translated" into a common coordinate system, it is possible to measure distances that extend over multiple images.

Because the camera is mounted to the gimbal, which in turn is securely mounted to a stationary support, successive images can be captured at similar camera settings. Embodiments of the invention therefore present an improvement over known "noisy" approaches such as the automated drone technique, in which it is difficult to synchronize distance measurements with the captured images, since the drone is generally always in motion: image data and rangefinder data may be generated and transmitted separately, so that in a "worst case" scenario from an image-stitching point of view, the images and the distance measurements are "out of sync" and distance measurements are incorrectly assigned to the images owing to the delay between the two types of data and drone movement within that short time interval.

Embodiments of the inventive method, in contrast, can deliver a sequence of images, each with highly accurate orientation information, so that the accuracy of the image-stitching procedure is correspondingly improved.

The gimbal settings can be related to a reference frame of the rotor blade, so that subsequent image analysis can allow any point in any image to be related to an "actual" point on the rotor blade surface. In other words, the position of a pixel in an image can be mapped to unique coordinates in the rotor blade reference frame. This allows a defect on the surface of the rotor blade to be identified by applying suitable image processing algorithms, for example algorithms that can detect color anomalies, edge anomalies, etc. Such algorithms will be known to the skilled person and need not be described in detail here. Any anomaly or "finding" detected by such an algorithm can be reported to a user along with the coordinates of the rotor blade reference frame. For example, the user may receive a message such as "possible surface defect at 25 m from root end, on suction side, 3 cm from leading edge". Such a defect report may also indicate the length, width, or area of the defect.

Defects resulting from impact (pitting, fissures, peeling outer paint layer etc.) are often found near the leading edge in the outer blade regions. This is because the rotational velocity of the rotor blade increases in the direction of the tip, and the impact speed of particles increases accordingly. Defects resulting from high loads and bending moments may present as cracks or wrinkles in the inboard region of the rotor blade. Embodiments of the inventive method can identify the location of any such defect to a favorably high degree of accuracy.

The aspect of embodiments of the invention are also achieved by a computer program product (non-transitory computer readable storage medium having instructions, which when executed by a processor, perform actions) with a computer program that is directly loadable into the memory of a control unit of the imaging arrangement, and which comprises program units to perform the steps of embodiments of the inventive method when the program is executed by the control unit.

BRIEF DESCRIPTION

Some of the embodiments will be described in detail, with reference to the following figures, wherein like designations denote like members, wherein.

DETAILED DESCRIPTION

Figure 1:
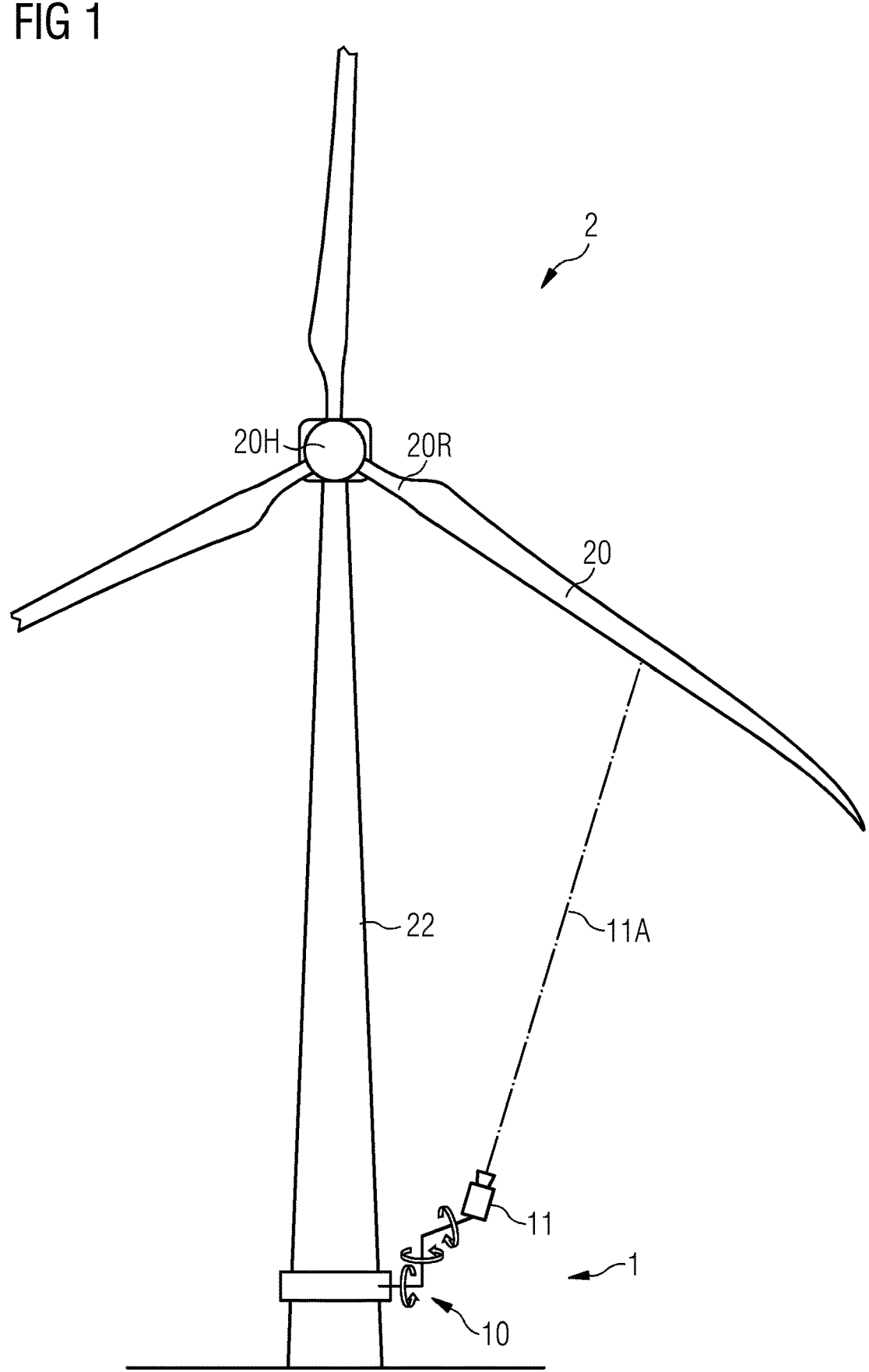
FIG. 1 shows an embodiment of the inventive wind turbine rotor blade imaging arrangement.
Figure 2:
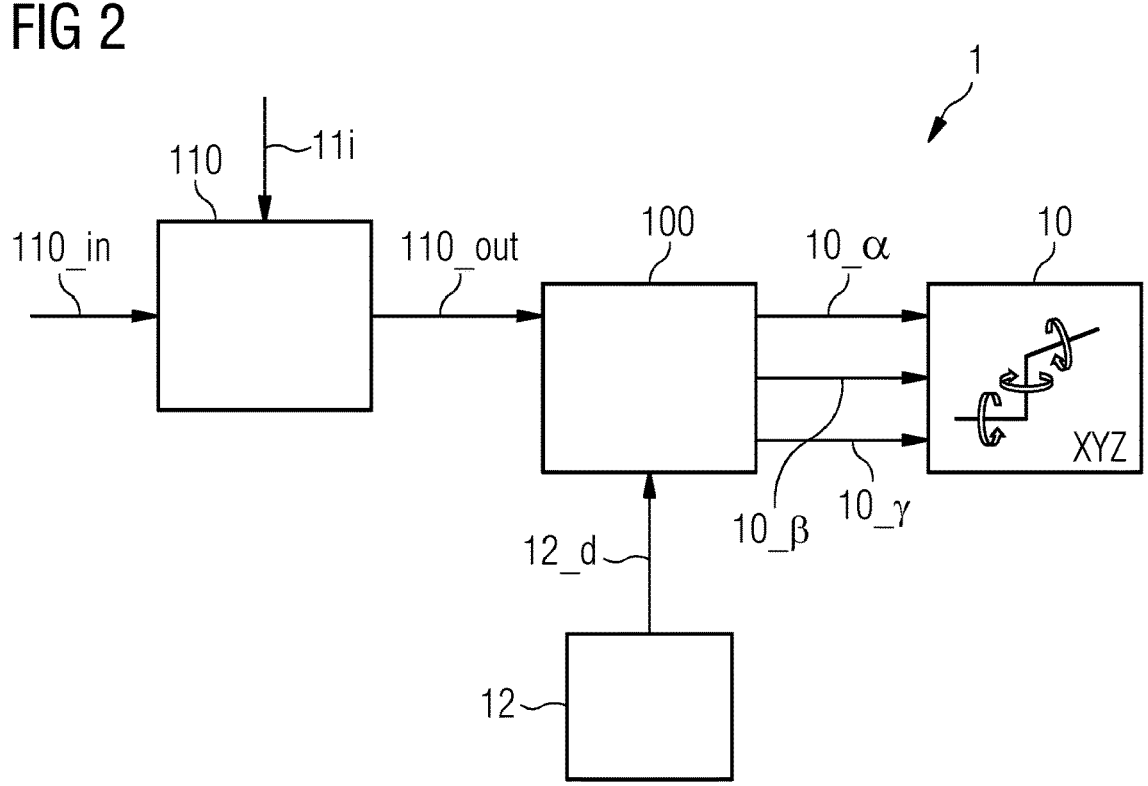
FIG. 2 is a simplified block diagram of an embodiment of the inventive wind turbine rotor blade imaging arrangement.
Figure 5:
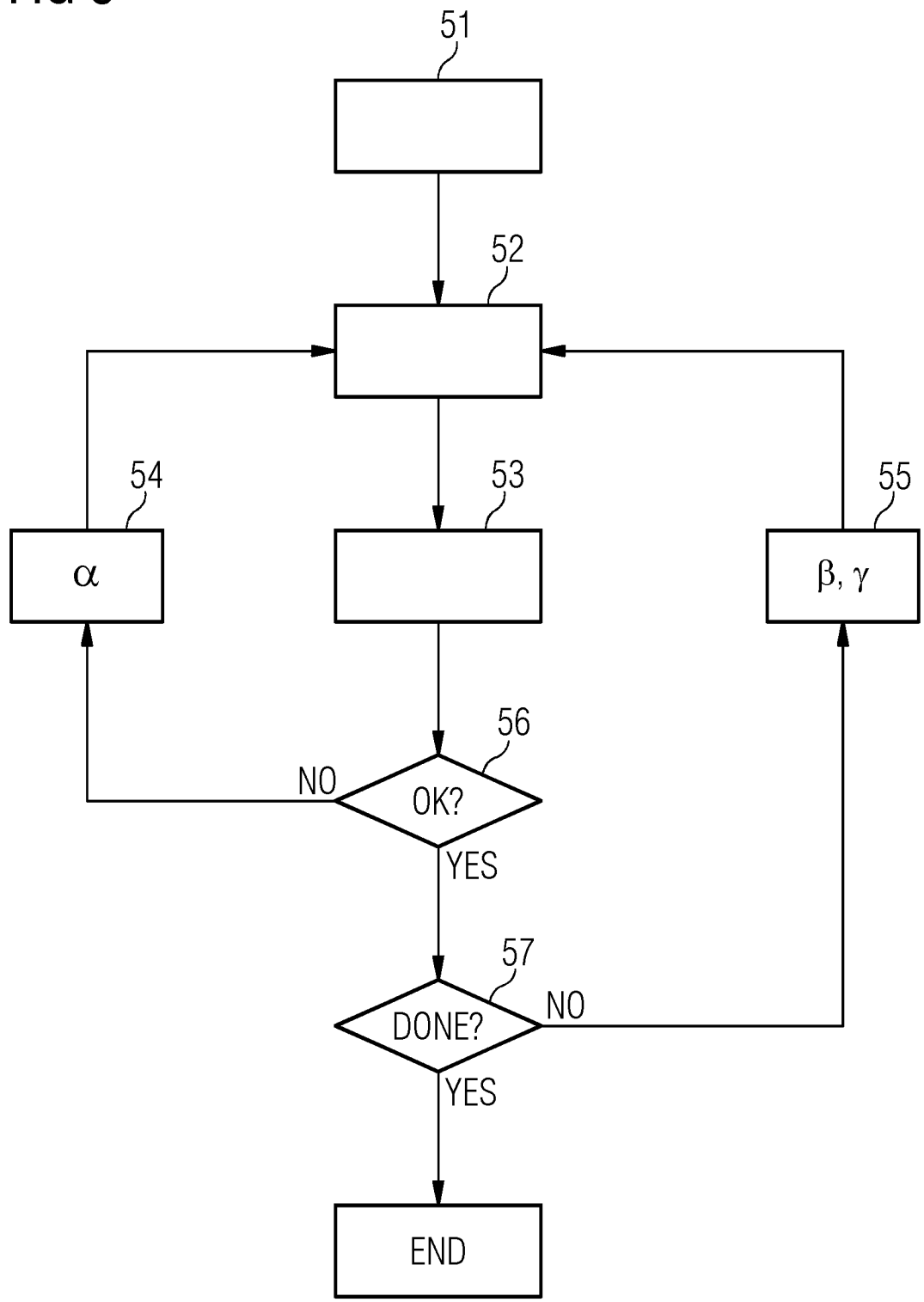
FIG. 5 is a flowchart illustrating steps of embodiments of the inventive method.

FIG. 1 is a simplified diagram of an embodiment of the inventive imaging arrangement 1, FIG. 2 shows a block diagram of embodiments of the inventive imaging arrangement 1, and FIG. 5 is a flowchart illustrating steps of embodiments of the inventive method. In FIG. 1, a camera 11 is mounted to a multi-axis gimbal, which is attached to a wind turbine tower 22. The camera 11 is mounted to a multi-axis gimbal 10. A rangefinder 12 measures the distance 12_d between camera 11 and an imaged surface of the rotor blade.

FIG. 2 is a simplified block diagram of embodiments of the inventive imaging arrangement. The diagram indicates a 3-axis gimbal 10, and a gimbal controller 100 which computes updated settings for the camera 11, which shall be understood to be mounted to the 3-axis gimbal 10 so that it can undergo rotation about three orthogonal axes in its frame of reference XYZ. Although a three-axis gimbal is discussed here, it shall be understood that the camera may be mounted to a two-axis gimbal. Such an embodiment may suffice for imaging a rotor blade that is not pre-bent, for example.

Before commencing an imaging sequence, a fixed frame of reference is defined. For example, a 3D coordinate system can be defined to have its origin in the center of the hub 20H (a dot indicates the origin at the geometric center of the hub 20H at the intersection of the longitudinal axes of the three rotor blades), with one of the three orthogonal axes arranged parallel to the longitudinal axis of the wind turbine tower. Equally, a 3D coordinate system can be defined to have its origin at the base of the rotor blade being imaged (another dot indicates the base of the rotor blade being imaged) with one of the three orthogonal axes coinciding with the longitudinal axis of the rotor blade 20. Once the reference frame is chosen, the imaging arrangement 1 can be set up by directing the optical axis 11A of the camera 11 towards the origin and capturing an initial image. At the same time, the distance to the imaged surface is measured, and the gimbal settings are noted. These parameters (reference frame origin, gimbal settings and initial distance) serve as the basis from which all subsequent images are defined.

In FIG. 1, the rotor blade 20 being imaged is shown at the "four o'clock" position. In this position, the camera 11 can image one entire side (e.g., the pressure side). The rotor blade 20 can then be turned to the "eight o'clock" position, so that the camera 11 can image its other side (e.g., the suction side). The gimbal settings are updated during an imaging procedure, for example during a procedure in which the camera 11 captures a sequence of images from root end 20R to tip end 20T of a rotor blade 20. The imaging sequence may start at the root 20R with an initial set of gimbal settings $10\_\alpha$, $10\_\beta$, $10\_\gamma$. Each image $11i$ is analyzed to determine the total progress as well as to determine the image quality. The distance $12\_d$ between camera and rotor blade 20, as reported by the rangefinder 12, can be used to update the pitch setting $10\_\alpha$.

If an image is deemed satisfactory, e.g., with respect to resolution, brightness, contrast, color, location of details of the photo taken, etc., one or more of the gimbal settings $10\_\alpha$, $10\_\beta$, $10\_\gamma$ can be updated to orient the camera in preparation for the next image capture step. If an image is deemed unsatisfactory, the gimbal settings $10\_\alpha$, $10\_\beta$, $10\_\gamma$ can be updated to fine-tune the camera's orientation in order to capture a more satisfactory image.

Since the camera 11 is mounted to the gimbal 10, the viewing angles of the camera 11 (at the instant an image $11i$ is captured) are directly related to the gimbal settings $10\_\alpha$, $10\_\beta$, $10\_\gamma$, so that the pitch, roll and yaw settings $10\_\alpha$, $10\_\beta$, $10\_\gamma$ of the gimbal 10 may be understood as the viewing angles of the camera 11. At any one time, the pitch, roll and yaw settings $10\_\alpha$, $10\_\beta$, $10\_\gamma$ of the gimbal 10 will determine the orientation of the camera's optical axis 11A.

Embodiments of the inventive method provide a way of optimally aiming the camera 11 at the rotor blade 20 to capture its entire length at a consistently high image quality, by continually adjusting the pitch, roll and yaw settings 10_α, 10_β, 10_γ of the gimbal 10.

The flowchart in FIG. 5 illustrates the steps of embodiments of the inventive method as carried out by the exemplary embodiment illustrated in FIG. 1 and FIG. 2. In a first step 51, the gimbal 10 is initialized so that the camera 11 is aimed at one end of the rotor blade, for example at the root end 20R. In a next step 52, the camera captures an image 11i, which is forwarded to an image analysis unit 110 and processed at stage 53. In one embodiment, the image analysis unit 110 informs the gimbal controller to "proceed" if the image was deemed satisfactory in step 56, or to "re-take" if the image was not deemed satisfactory. Before re-taking an image 11i at the same pitch setting 10_α, the yaw setting 10_β and/or roll setting 10_γ are adjusted as appropriate in stage 54. The necessary amount of adjustment can be indicated by the image analysis unit 110, which may inform the gimbal controller 100 by how much the camera should be adjusted about a particular axis for the next image, as appropriate. Prior to capturing a subsequent image at stage 52, the gimbal settings 10_α, 10_β, 10_γ are passed to the gimbal 10, so that the orientation of the camera 11 will be adjusted in readiness for the image capture step 52. The process is repeated until the entire rotor blade 20 has been imaged. After each satisfactory image, the pitch setting can be updated in step 55 to turn the camera further outward in the direction of the rotor blade tip. Any unsatisfactory image may be retaken by adjusting the yaw setting 10_β and/or roll setting 10_γ in step 54 as explained above. In step 57, completion of the imaging procedure is detected by the image analysis unit 110, which for example may be able to recognize the rotor blade tip in a final satisfactory image.

Of course, embodiments of the inventive method could be performed by analyzing each image to determine pitch, roll and yaw settings 10_α, 10_β, 10_γ for the subsequent image, so that the likelihood of an unsatisfactory image is reduced.

However, it may be quicker to simply adjust the pitch setting 10_α as described above, and to correct for yaw and/or roll as necessary, since these corrections may become more relevant towards the thinner airfoil part of the rotor blade, whose curved shape may require more adjustments of the camera's orientation.

Figure 3:
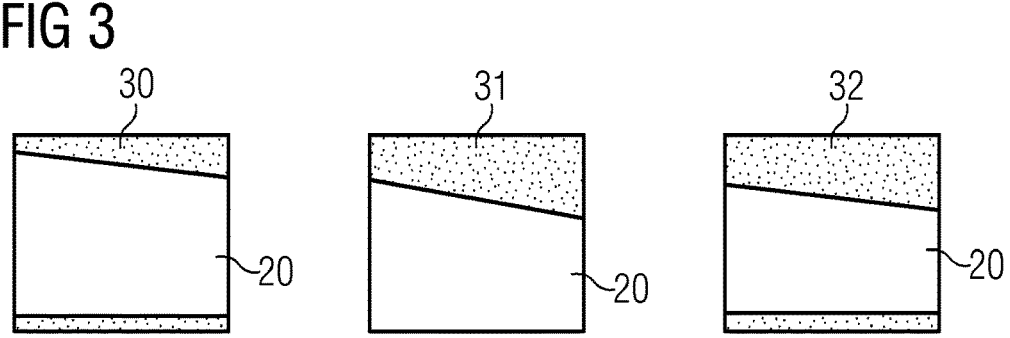
FIG. 3 illustrates a stage during implementation of embodiments of the inventive method.
Figure 4:
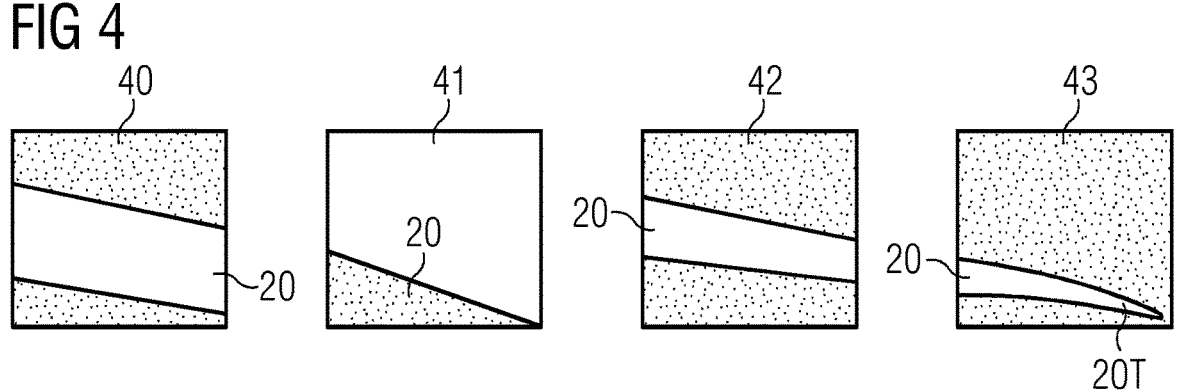
FIG. 4 illustrates a stage during implementation of embodiments of the inventive method.

FIG. 3 illustrates a stage in embodiments of the inventive method. Any of the images described in the following may be regarded as an image 11i captured at stage 52 of the flowchart of FIG. 5. An image 30 has been analyzed and deemed to be satisfactory. The gimbal settings are updated to pitch the camera further outward, and a subsequent image 31 is captured. However, image analysis deems this subsequent image 31 to be sub-optimal, because it does not include both edges of the rotor blade 20 (of course, some other criterion may determine whether or not an image is satisfactory). Therefore, the gimbal controller 100 adjusts the gimbal settings to adjust the yaw and/or roll settings (leaving the pitch setting unchanged), and another image 32 is captured. Image analysis approves this image 32 since it shows the rotor blade from edge to edge. The gimbal settings can be adjusted once more to pitch the camera further outward, proceeding to capture further images in the direction of the rotor blade tip, as illustrated in FIG. 4. Here, an image 40 has been analyzed and deemed to be satisfactory. The gimbal settings are updated to pitch the camera further outward, and a subsequent image 41 is captured. However, because the rotor blade 20 is pre-bent and curves markedly in the upwind direction in its non-loaded state, the narrow tip end is no longer within the camera's field of view, and image analysis deems this subsequent image 41 to be sub-optimal. Therefore, the gimbal controller adjusts the gimbal settings to adjust the yaw and/or roll settings (leaving the pitch setting unchanged), and another image 42 is captured. Image analysis approves this image 42 since the camera's orientation was changed to capture the narrow airfoil from edge to edge. The gimbal settings can be adjusted once more to pitch the camera even further outward to capture an image 43 of the rotor blade tip 20T.

Figure 6:
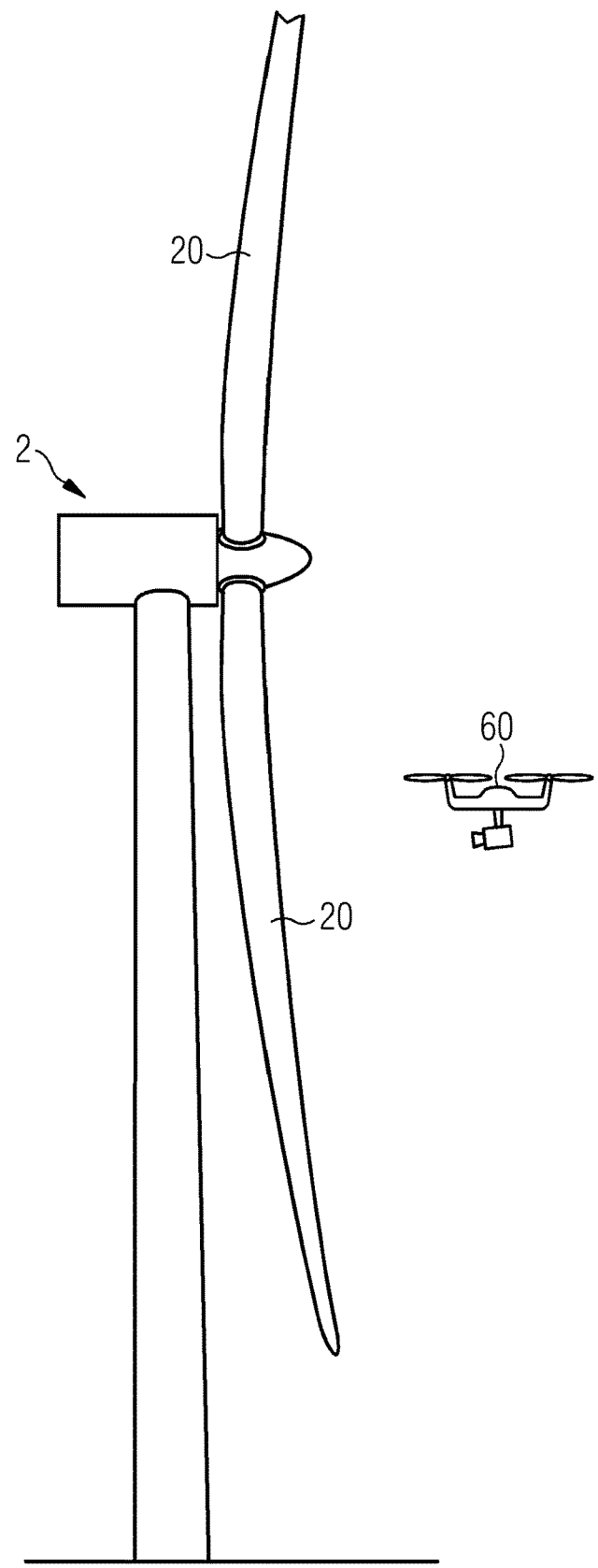
FIG. 6 illustrates a conventional art imaging arrangement.

FIG. 6 shows an implementation of a conventional art method. Here, a camera-carrying drone 60 is used to capture images of a rotor blade 20. The images can be quite "noisy" owing to the difficulty in maintaining a steady drone position even in low-wind conditions, and also because of the inherent inaccuracies in satellite-based geolocation readings. The noise can make image stitching difficult and can lead to poor results. If the quality is not satisfactory, the procedure must be carried out again, leading to more downtime and loss of revenue.

Figure 7:
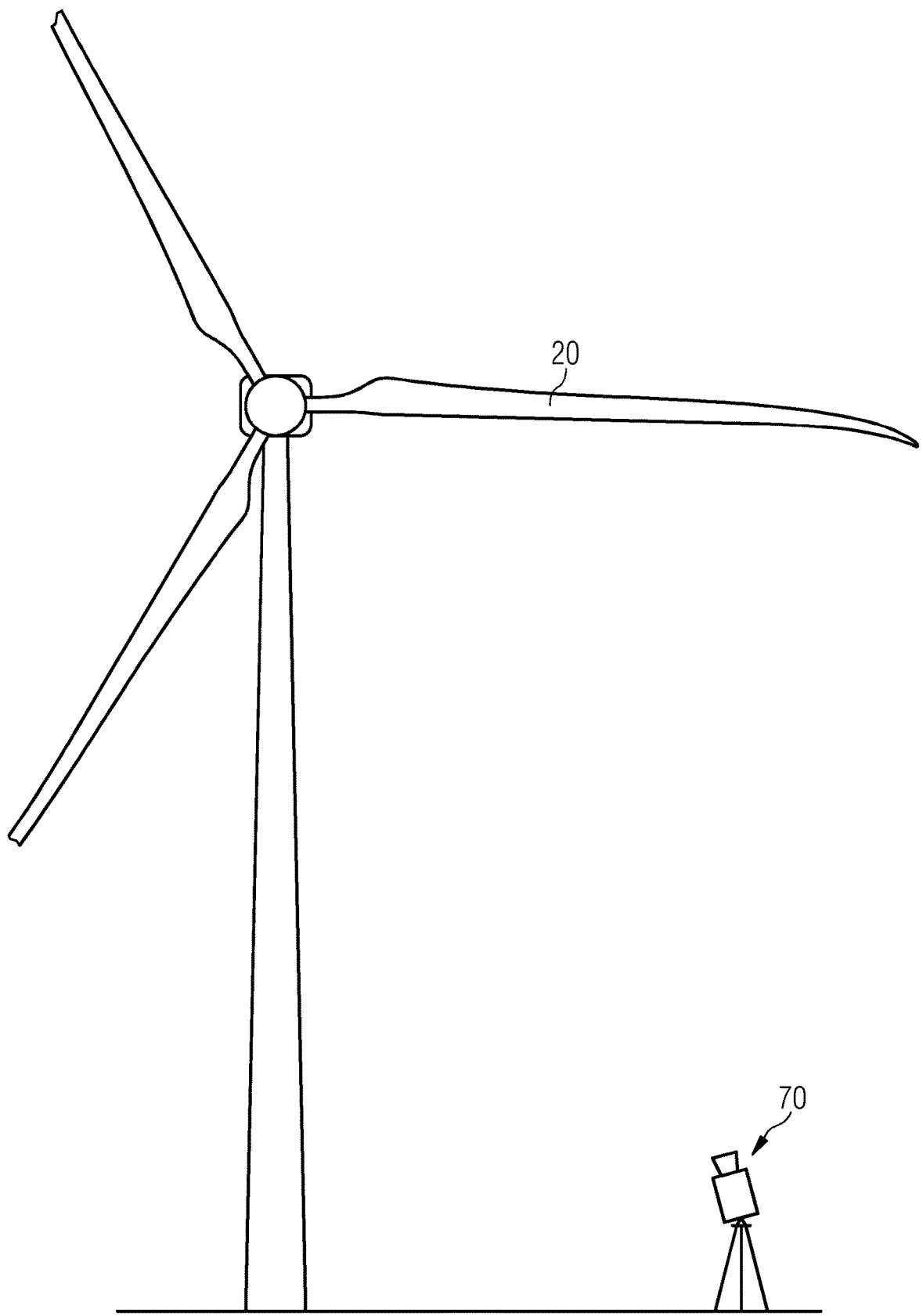
FIG. 7 illustrates a conventional art imaging arrangement.

FIG. 7 shows a further conventional art technique, in which a stationary camera 70 is arranged to be able to view any part of the rotor blade 20. However, in the case of pre-bent rotor blades as shown here, it may be difficult and time-consuming to adjust the camera settings in order to capture the entire rotor blade surface.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A wind turbine rotor blade imaging arrangement, comprising:
   a multi-axis gimbal mounted to the exterior of the wind turbine and configured to adjust its orientation in response to one or more received gimbal settings wherein the gimbal settings comprise any of a pitch angle, a roll angle, a yaw angle;
   a camera mounted on the multi-axis gimbal and arranged to capture images of a rotor blade;
   an image analysis unit configured to analyze the captured images and generating image analysis output out; and
   a camera orientation controller configured to compute updated gimbal settings on the basis of the image analysis output.

2. The wind turbine rotor blade imaging arrangement according to claim 1, wherein the wind turbine rotor blade imaging arrangement, the image analysis unit and/or the camera orientation controller, is/are configured for repeating capturing an image of the rotor blade or of a rotor blade region, analyzing the captured image, and adjusting the gimbal settings on the basis of the image analysis output until the image of the rotor blade or of the rotor blade region is deemed satisfactory.

3. The wind turbine rotor blade imaging arrangement according to claim 1, wherein the multi-axis gimbal is configured to rotate about a first axis, to rotate about a second axis, which second axis is orthogonal to the first axis, and wherein the multi-axis gimbal is configured to rotate about a third axis, which third axis is orthogonal to the first axis and the second axis.

4. The wind turbine rotor blade imaging arrangement according to as claim 1, comprising a rangefinder configured to measure a distance between the camera and an imaged region of the rotor blade, further comprising a camera controller configured to adjust the focal length of the camera on the basis of the measured distance and/or on the basis of the image analysis output.

5. The wind turbine rotor blade imaging arrangement according to claim 1, wherein the multi-axis gimbal is mounted to the exterior of the wind turbine tower.

6. A method of imaging a wind turbine rotor blade, which method comprises:
    providing the multi-axis gimbal of the wind turbine rotor blade imaging arrangement according to claim 1 to an exterior of the wind turbine; and
    operating the camera of the wind turbine rotor blade imaging arrangement to capture images of the rotor blade, whereby a step of capturing an image is preceded by a step of adjusting one or more gimbal settings of the multi-axis gimbal at least on the basis of the image analysis output.

7. The method according to claim 6, comprising a step of analyzing the images and computing the gimbal settings to direct the optical axis of the camera at a target region on the rotor blade.

8. The method according to claim 6, wherein the steps of capturing an image of a rotor blade region, analyzing the captured image, and adjusting the gimbal settings on the basis of the image analysis output are repeated until the image of that rotor blade region is deemed satisfactory.

9. The method according to claim 6, wherein the method comprises a step of determining the imaged fraction of the rotor blade.

10. The method according to claim 6, wherein a completion of the imaging procedure is detected by the image analysis unit.

11. The method according to claim 6, wherein an imaging procedure comprises:
    bringing the rotor blade into a first angular position prior to imaging one side of the rotor blade; and
    bringing the rotor blade into a second angular position prior to imaging the other side of the rotor blade.

12. The method according to claim 6, comprising a step of pitching the rotor blade about its longitudinal axis during the imaging procedure.

13. The method according to claim 6, comprising a step of analyzing the captured images to identify a finding on the rotor blade and to determine the coordinates of the finding in a reference frame of the rotor blade.

14. The method according to claim 1, wherein an initial calibration procedure comprises,
    defining a fixed reference frame;
    directing the optical axis of the camera towards the origin of the reference, frame and capturing an initial image; and
    recording a distance measurement for the initial image.

15. A computer program product, comprising a computer readable hardware storage device having computer readable program code stored therein, said program code executable by a processor of a computer system to implement a method for carrying out the steps of the method according to claim 6 when the computer program product is loaded into a memory of a programmable device configured to control one or more components of the wind turbine rotor blade imaging arrangement.

* * * * *